Patented Nov. 7, 1933

1,933,739

UNITED STATES PATENT OFFICE 1,933,739

PROCESS OF PRODUCING GLASS

Hobart M. Kraner, Greensburg, Pa.

No Drawing. Application September 2, 1931
Serial No. 560,882

7 Claims. (Cl. 106—36.1)

My invention relates to processes of producing glass or similar pre-metal vitreous products and it has for one of its objects the supplying of certain ingredients thereof from other materials that have been at least partially vitrified, pre-calcined or fired.

Another object of my invention is to reduce losses ordinarily attending the manufacture of vitrified or partially vitrified bodies, such as porcelain, by employing the scrap thereof in the manufacture of initially melted vitreous bodies, such as glass.

Another object of my invention is to supply ingredients to glass, such as fluxes, alumina and colorants, that are already embodied in manufactured bodies other than glass.

Another object of my invention is to provide a constituent for glass or like material that shall be easily wetted by a batch or melt of the other constituents.

Another object of my invention is to facilitate, economize and improve the manufacture of glass.

A further object of my invention is to provide ingredients of glass in more readily soluble and diffusable form.

Heretofore, in the manufacture of glass, the several elements have been employed as found in nature.

Feldspar, the principal source of alumina for glass, is relatively expensive, besides containing this element, along with other elements, such as silica, iron oxide, calcium oxide, magnesium oxide, sodium oxide and potash, in more or less irregular percentages as mined.

The same difficulty and expense attend the provision of fluxes, such as sodium oxide, potash, barium oxide, lead oxide, lime and magnesium oxide, and the provision of colorants, such as iron oxide, copper oxide, etc. which are also provided from the raw or natural materials.

In the manufacture of porcelain ware, such as heat and electrical insulators and dishes, much ordinarily unusuable and waste material, in the form of scrap, results. This material contains, in uniformly-distributed and highly diffusable form, most of the elements of raw feldspar.

By way of example and comparison, an analysis of a usual feldspar has shown it to contain approximately 68.02% silica ($SiO_2$), 18.11% alumina ($Al_2O_3$), 0.067% iron oxide ($Fe_2O_3$), .55% calcium oxide (CaO), .04% magnesium oxide (MgO), 3.08% sodium oxide ($Na_2O$), 9.82% potassium oxide (9.82), and .23% loss by ignition. A highly vitrified porcelain body, as employed in high-voltage insulators, has been shown to contain approximately 70.22% silica, 24.54% alumina, .28% iron oxide, .18% calcium oxide, .10% magnesium oxide, .56% sodium oxide and 3.93 potash, from which it is seen that the porcelain is not only as good a source of alumina, flux and colorant as the feldspar, so far as content is concerned, but contains these elements in more evenly distributed and readily diffusable form.

Other preformed or manufactured bodies of various degrees of vitrification, such as magnesia porcelain, ordinary fired clay bricks and the like, contain the above and other elements in more evenly distributed form than in the raw state and in various proportions.

To the best of my knowledge and belief, none of these bodies, such as scrap porcelain, clay bricks and the like have ever before been employed as sources of alumina, flux or colorants in glass batches.

By grinding the scrap at the source, its bulk is reduced for shipping and it is placed in such form as to be more readily received and dissolved in the glass batch, and, since it has already been fired or partially fired the ingredient desired could hardly be prepared in a more suitable manner for quick and uniform distribution in the glass.

In the manufacture of glass the raw materials are mixed dry, placed in a pot or tank and heated to temperatures approximating 1300 to 1500° centigrade, depending upon the composition desired.

An example of a glass, for which my invention is adapted, comprises 54% silica sand, 21.6% sodium oxide, 7.10% lime, 1.1% potash and 16% porcelain scrap.

All of these elements may be placed together and melted, or the porcelain may be withheld until the other elements have melted and then added. In either case, the porcelain is more easily wetted by the other melted materials and goes into the solution or mix more rapidly and evenly.

The different prefired bodies mentioned may be selected, according to their content, as sources of alumina, fluxes or colorants severally or in combination, and, while I have described particular forms of my invention, changes may be effected therein without departing from the spirit and scope thereof, as set forth in the appended claims.

I claim as my invention:

1. The process of producing glass which includes the step of combining a partially vitrified material produced by firing a body including clay and a flux with other glass-forming ingredients.

2. The process of producing glass which includes the step of combining the scrap of partially vitrified fired bodies containing clay and a flux to other glass-forming ingredients.

3. The process of producing glass which includes the step of combining scrap porcelain with other glass-forming ingredients.

4. The process of producing glass which includes the step of combining a partially vitrified material produced by firing a body including clay and a flux with other glass-forming ingredients, the ingredients of said body being in diffused form.

5. The process of producing glass which includes the step of combining a partially vitrified material produced by firing a body including clay, flux and a colorant with other glass-forming ingredients.

6. The process of producing glass which includes the steps of melting together a portion of the ingredients necessary to form the glass and adding material produced by firing a body including clay and a flux and that is easily wetted by the melt.

7. The process of producing glass which includes the step of combining a partially vitrified material produced by firing a body including clay, silica and a flux with other glass-forming ingredients.

HOBART M. KRANER.